Nov. 3, 1959   J. H. ROSS   2,911,635
SIGNAL EQUIPMENT FOR MOTOR VEHICLES
Filed Dec. 3, 1956   3 Sheets-Sheet 1
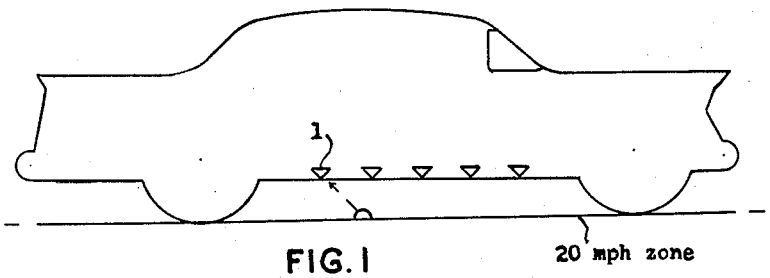
FIG. 1   20 mph zone
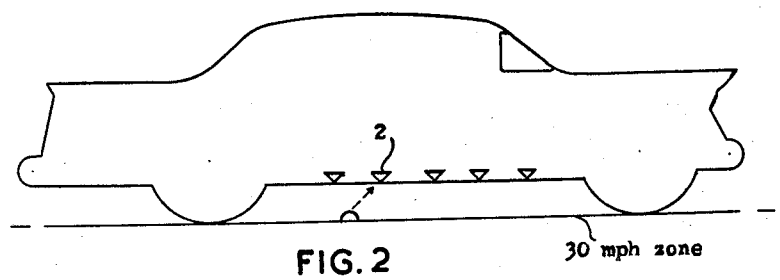
FIG. 2   30 mph zone
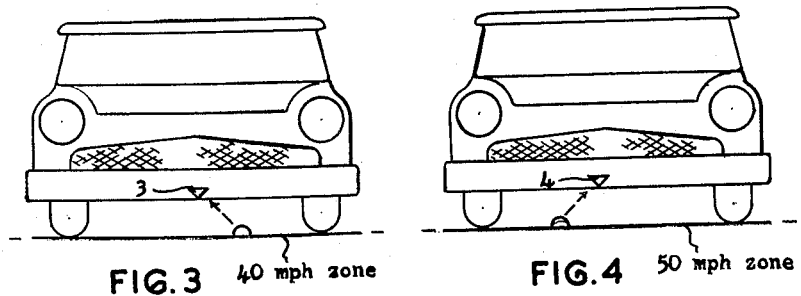
FIG. 3   40 mph zone   FIG. 4   50 mph zone
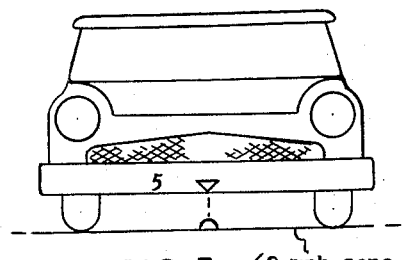
FIG. 5   60 mph zone
Inventor
JACK H. ROSS
Attorney Inventor
JACK H. ROSS Nov. 3, 1959  J. H. ROSS  2,911,635
SIGNAL EQUIPMENT FOR MOTOR VEHICLES
Filed Dec. 3, 1956  3 Sheets—Sheet 3
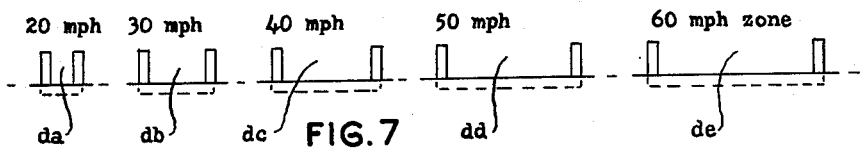
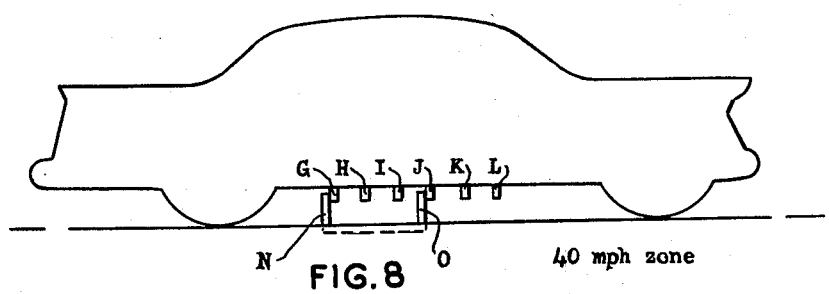
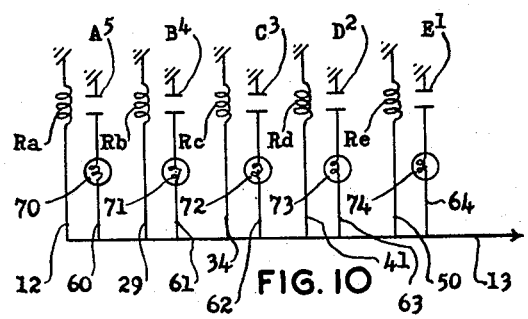
Inventor
JACK H. ROSS
Attorney

United States Patent Office 2,911,635
Patented Nov. 3, 1959

---

2,911,635

SIGNAL EQUIPMENT FOR MOTOR VEHICLES

Jack H. Ross, Ottawa, Ontario, Canada

Application December 3, 1956, Serial No. 625,881

2 Claims. (Cl. 340—263)

My invention relates to speed control and warning equipment adapted for use on motor vehicles.

It is unfortunate that the pleasure and usefulness derived from motoring has been marred by increase in the number of accidents and casualties arising therefrom, and while a few of the accidents may be the result of defective mechanisms, the great majority are directly attributable to omissions on the part of the driver of the motor vehicle and/or automobile involved in the accident.

The increase in the motive power of motor vehicles, and the improvement in roadways have regrettably incited or tempted drivers to indulge in too fast driving, or what is commonly known as "speeding."

However speeding may arise from many other causes, such as a driver's failure to give his undivided attention to his driving, accompanied by failure to observe the traffic rules and regulations in force in the district through which he is driving, and further a driver may suffer from fatigue after driving for a long period of time and distance without proper rest, and unconsciously accelerate his vehicle to a speed which is an infraction of the traffic laws.

Weather conditions call for an alert driver, and the rules of the road should impel the driver to comply by driving at a speed lower than that which is permissible under more favourable conditions.

Accidents may result from loss of control of a vehicle by a driver, also when a driver is unable to quickly stop his vehicle to avoid children or pedestrians or other vehicular traffic on the road, and other circumstances where omission of the driver to take effective action to avert accidents occur.

To provide for the safe use of roads by motor vehicles, the duly appointed authorities in cities, towns, villages and for highways have found it expedient to zone the different parts of the road as to the safe maximum speed permitted, and with which all drivers of motor vehicles must comply. Unfortunately the observance of speed regulations is not always easy to enforce, and safe driving today depends to a great extent upon the cooperation of the drivers of motor vehicles in the observance of the traffic laws.

In all the circumstances referred to above, it will be clear that the personal equation enters largely into the success of safe motoring with reduction in the number of accidents.

Because of the above and other reasons, it appears obvious to me that the first approach to reducing automobile accidents is to devise an effective warning means for drivers, to deter them from exceeding the recognized speed limits which are compatible with safe roads and traffic conditions. I therefore came to the conclusion when making my invention, to accomplish the following objects.

One of the objects of my invention is to provide an installation or mechanism for motor vehicles, whereby the driver of the vehicle may be given a preliminary warning that he is exceeding the traffic speed regulations of the zone through which he is travelling.

Another object is to give a second or subsequent audible and visual warning, not only to the driver of the vehicle, but to other drivers or pedestrians in the vicinity that the first driver is not observing the speed limit set for that particular zone through which he is driving.

A further object is to continue the second warning until the driver takes remedial action to comply with the traffic regulations as to speed, before that warning can be terminated.

Another object of my invention is to control the operation of the second warning by a time relay, so that should the driver of a vehicle equipped with my invention increase speed to pass another vehicle, then the second warning will not be instituted, provided the elapsed time of passing is not prolonged beyond the time lag under which the relay operates.

A further object of my invention is to provide a speed controller actuated by the prime mover of a motor vehicle in accord with the variable forward speeds of a motor vehicle, and co-acting with equipment on the automobile actuated by roadway instrumentalities, and responsive to the speed controller, to give a warning to the driver that the vehicle is exceeding a predetermined speed.

Still another object is to construct my invention so that it is difficult to tamper with (without detection), and to give a visual warning to traffic officers or other patrolling police that the driver of the vehicle should be stopped for interrogation.

Still another object of my invention is to so construct the device that its operation may be automatically controlled by different instrumentalities such as photo electric cells, wiping electrical contacts, mechanical or radio switching.

A further object still is to adapt my invention so that it may be automatically set to operatively cover the range of traffic zones usually encountered in motoring through cities, towns, villages or on highways throughout the country in which the motor vehicle is in use.

Another object of my invention is to construct and arrange the several parts so that positive warnings are given only during an infraction of the speed regulations in force in the zones or districts through which the vehicle is travelling, and to eliminate any possibility of false alarms or warnings being given.

Other objects will be made clear as the specification develops.

So that the nature of my invention will be clearly understood, I have illustrated diagrams of an embodiment of the same capable of operation by photo electric cells, wiping electrical contacts, mechanical or radio switching, and I shall describe the operation of the above embodiments in detail, but I wish it to be understood that I do not limit my invention to such specific diagrams and descriptions, but reserve the right to modify the construction and arrangement of parts within the scope of my appended claims.

In the drawings:

Figure 1 shows an automobile in silhouette passing over a light beam in a twenty mile zone of a roadway, the light beam being directed in the proper direction and angle relatively to a photo electric cell so as to impinge on a particularly disposed photo electric cell, such as is identified as No. 1, on the underbody of the automobile.

Figure 2 shows an automobile in silhouette, passing over a light beam on a thirty mile zone of a roadway with the light beam so arranged at the proper angle and in the proper direction that it can impinge only on photo electric cell No. 2 mounted on the under body of the automobile.

Figure 3 shows an automobile in silhouette passing over a light beam located on a forty mile zone of a roadway, with the light beam so arranged at the proper angle and in the proper direction that it can only impinge on photo electric cell No. 3 mounted on the under body of the motor vehicle.

Figure 4 shows an automobile in silhouette passing over a light beam installed on a fifty mile zone of a roadway, with the light beam so arranged and directed that it can only impinge on photo electric cell No. 4 mounted on the under body of the automobile.

Figure 5 shows an automobile in silhouette passing over a light beam installed on a sixty mile zone of a roadway, with the light beam so arranged and directed that it can impinge only on photo electric cell No. 5 mounted on the under body of the automobile.

Figure 7 is a digrammatic arrangement of wiper electric devices arranged on a roadway and located in speed zones from 20 m.p.h. through other speed zones up to 60 m.p.h.

Figure 8 shows an automobile in silhouette, showing the location of a roadway electric wiper and the relative position of wipers mounted on the under body of the automobile, the roadway wiper bridging the space between the common wiper and the 40 m.p.h. wiper.

Figure 10 shows a diagram of an arrangement of a plurality of coloured lights to correspond with the different speed settings of the speed controller, and designed to indicate that the controller has switches to the proper speed of the zone through which the vehicle is passing.

Like characters of reference refer to like parts in the several figures.

Figure 6:
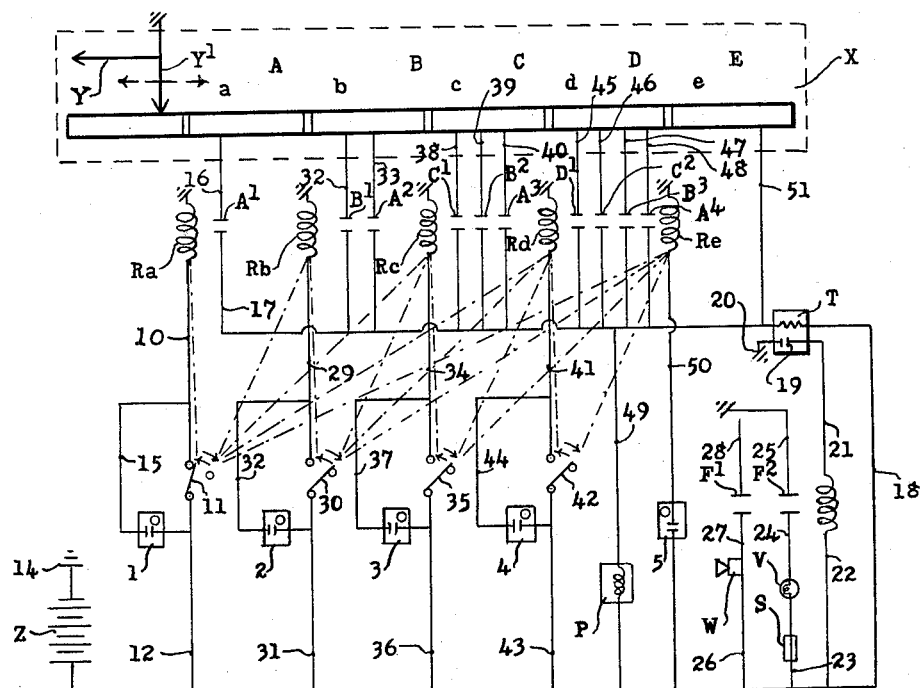
Figure 6 is a diagrammatic layout of the signal adapted to be intsalled on an automobile showing a speed control and warning system arranged for operation in roadway zones having varying allowable speed limits from 20 m.p.h. to 60 m.p.h.

Referring to Figure 6 of the drawings, X represents a diagrammatic arrangement of my speed control and warning device with which a motor vehicle is equipped, and including an r.p.m. switch Y which is operated by the prime mover of the motor vehicle, the switch having an arm $Y^1$ adapted to engage in turn with the contacts A, B, C, D and E, as the speed of the motor vehicle increases, one end of the arm being grounded. The contacts A, B, C, D, and E are electrically insulated from each other as shown at $a$, $b$, $c$, $d$ and $e$.

A relay $Ra$ is provided, one end of which is grounded, the other end of the relay being connected through the wire 10 with a micro switch 11, which in turn is connected by the wire 12 with the common hot wire 13. This hot wire 13 is operatively connected to the hot terminal of a source of electrical energy Z, for example the car battery, the other terminal of the battery being grounded as at 14.

A shunt 15 is provided around the micro switch 11, and in this shunt a photo electric relay contact 1 is connected. The contact A of the r.p.m. switch Y is connected by the wire 16 with one side of the contact $A^1$ associated with the relay $Ra$, and the other side of the contact $A^1$ is connected by the wire 17 to a delay relay T which is connected by the wire 18 with the common hot wire 13 and this wire 17 is further connected by the wire 49 through the dash buzzer P with the hot wire 13.

Forming part of the delay relay T is the contact 19, one side of this contact being grounded by wire 20, the other side being connected by the wire 21 with the relay $Rf$ which in turn is connected through the wire 22 with the hot wire 13. The hot wire 13 is connected by a wire 23 with a flasher S connected in series with a light V which is connected by the wire 24 with one side of a contact $F^2$ the other side of which is grounded through the wire 25.

Arranged adjacent to the flasher S and light V is a horn W connected by the wire 26 with the hot wire 13, the horn being connected through a wire 27 with one side of contact $F^1$ the other side of the contact being connected to the wire 28 which is grounded. The wires 25 and 28 are shown with a common ground but obviously they may be individually grounded if desired so that the flasher S and coacting light 24 and the horn W are on separate circuits.

The relay $Rb$ has one end grounded, the other end being connected through the wire 29 with a micro switch 30 which in turn is connected by the wire 31 with the hot wire 13. A shunt 32 extends around the micro switch 30, and in this shunt the photo electric relay contact 2 is connected. The contact B of the r.p.m. switch is connected by the wire 32 through the contact $B^1$ with the wire 17, and the contact B is further connected by the wire 33 through the contact $A^2$ with the wire 17. The contact $B^1$ is controlled by the relay $Rb$ and the contact $A^2$ is controlled by the relay $Ra$.

A relay $Rc$ is provided, one end of which is grounded, the other end being connected by the wire 34 to one side of the micro switch 35, and the other side of the micro switch is connected by the wire 36 to the hot wire 13. A shunt 37 extends around the micro switch 35 and to this shunt the contact of photo electric cell 3 is connected.

The contact C of the r.p.m. switch is connected by the wires 38, 39 and 40 through the contacts $C^1$, $B^2$ and $A^3$ with the wire 17, these contacts being controlled by the relays $Rc$, $Rb$ and $Ra$ respectively.

The relay $Rd$ has one end grounded, the other end being connected by the wire 41 with the micro switch 42 which in turn is connected by the wire 43 with the hot wire 13. A shunt 44 extends around the micro switch 42, and in this shunt the contact of a photo electric cell 4 is connected.

The contact D is connected by the wires 45, 46, 47 and 48 through the contacts $D^1$, $C^2$, $B^3$ and $A^4$ with the wire 17. The contacts $D^1$, $C^2$, $B^3$ and $A^4$ are controlled by the relays $Rd$, $Rc$, $Rb$ and $Ra$ respectively.

A relay $Re$ is provided, one end of which is grounded, the other end being connected by the wire 50 to the contact of photo electric cell 5 which is connected to the hot wire 13, and the contact E of the r.p.m. switch is connected by the wire 51 with the wire 17.

When a motor vehicle equipped with my speed control and warning device has entered a 20 m.p.h. roadway zone, a beam of light M which is installed on the roadway and is directed at the proper angle and in the proper direction to impinge on photo electric cell 1, causing its contacts to close and current then flows from the source of electric energy Z, the hot wire 13, wire 12, shunt 15, wire 10, relay $Ra$ to ground, and then to the source of energy Z, and the energized relay $Ra$ then closes the micro switch 11. After the vehicle has passed beyond the road light beam the photo electric cell is no longer energized and thus its contacts open. However, as the micro switch 11 is now closed, the circuit of relay RA is still completed through the micro switch 11 and the relay $Ra$ thus remains energized as long as this micro switch is closed.

The energized relay $Ra$ also closes the contacts $A^1$, $A^2$, $A^3$ and $A^4$.

If the motor vehicle is exceeding the 20 m.p.h. speed limit, then r.p.m. switch arm $Y^1$ will make contact with one of the r.p.m. contacts A, B, C, D or E, depending on the speed at which the vehicle is travelling, and current will flow through the appropriate r.p.m. switch contact $A^1$, $A^2$, $A^3$, $A^4$ or wire 51 (depending upon the position of the arm $Y^1$). For instance, if the arm $Y^1$ is in contact with the contact A, then current will flow through the wire 16, contact A¹, wire 17, wire 49, dash buzzer P, hot wire 13, thence through the source of electric energy Z and to the grounded arm $Y^1$ of the switch Y, completing an electric circuit, and the dash buzzer P is sounded to notify the driver of the vehicle that he is exceeding the speed of 20 m.p.h. which is permissible in the zone through which the vehicle is travelling. Another circuit of a similar nature could be completed with respect to contacts B, C, D or E, depending on whichsoever of these contacts the switch arm $Y^1$ is in engagement.

Simultaneously current is flowing from switch arm $Y^1$, contact A, wire 16, contact A¹, wire 17, delay relay T, wire 18, hot wire 13 and thence through the source of electric energy Z to ground so completing an electric circuit. After a predetermined time limit, to which the delay relay T is set, the delay relay will then close its contacts 19, and current flows from the source of electric energy Z through the ground wire 20, contact 19, wire 21, relay $Rf$, wire 22, hot wire 13 to the source of electric energy Z and ground, completing an electric circuit and energizing the relay $Rf$ which closes its contacts $F^2$ and $F^1$.

Current now flows through the wire 25, contact $F^2$, light V, flasher S, wire 23, hot wire 13 to the source of electric energy Z and ground, closing a circuit so that the flasher S and the light B are brought into operation. Simultaneously, current flows through the wire 28, contact $F^1$, wire 27, horn W, wire 26, hot wire 13, source of electric energy Z to ground, thus completing the circuit so that the horn W is sounded.

The driver should take prompt remedial action and reduce the speed of the motor vehicle when he first hears the dash buzzer, so that the dash buzzer would be shut off.

If however the driver fails to take this remedial action, then the horn and flashing light would operate after the expiry of the predetermined time delay allowed by the delay relay T.

The annoyance of hearing the horn blaring steadily, should alone cause the driver to desire to reduce the speed of the vehicle in order to silence the horn. If this should not prove sufficient, then the fact that the blaring horn and flashing light is focussing the attention of other drivers, and possibly a police officer on himself, would in all probability cause the driver to take immediate action to slow down the vehicle to within the permissible speed limit of the zone through which he is passing. Finally if the driver still persists in speeding, then any police officer within hearing distance, or within sight of the flashing light could easily identify the vehicle as exceeding the speed limit.

As the vehicle proceeds into a 30 m.p.h. zone of roadway it passes through a light beam M which is part of the roadway equipment of that zone, and this light beam being arranged at the proper angle, and being properly directed, impinges on photo electric cell 2 and energizes this cell, so closing its contacts and current flows from the source of electric energy Z, through hot wire 13, wire 31, photo electric cell contacts 2, shunt 32, wire 29 to the relay $Rb$, to ground and back to the source of electric energy Z, completing a circuit so that the relay $Rb$ becomes energized closing the micro switch 30. Micro switch 30 being now closed will keep the relay RB energized after the photo cell contacts 2 have opened.

The energizing of the relay $Rb$ also causes the micro switch 11 to open, and as the relay $Ra$ is thus de-energized, then the contacts A¹, A², A³ and A⁴ are opened, however the contacts B¹, B² and B³ are closed by the relay $Rb$.

Since the relay contact A¹ is now open, the delay relay T and dash buzzer P cannot be energized unless the vehicle exceeds 30 m.p.h. and therefore the dash buzzer, horn and flashing light will not go into operation at speeds below 30 m.p.h.

Should the vehicle now exceed the 30 m.p.h. speed limit then the r.p.m. switch arm $Y^1$ will make contact with one of the r.p.m. contacts B, C, D or E depending on the speed at which the vehicle is travelling, and current will then flow through the appropriate r.p.m. switch contacts $B^2$, $B^3$, $B^4$ or wire 51 (depending upon the position of the arm $Y^1$), for instance if the arm $Y^1$ is in contact with the contact B, then current will flow from the switch arm $Y^1$, contact B, wire 32, contact B¹, wire 17, wire 49, to the dash buzzer P, thence through hot wire 13 to the source of electric energy Z to ground and back through the arm $Y^1$, so completing an electric circuit, and the dash buzzer P is sounded to notify the driver of the vehicle that he is exceeding the speed of thirty miles per hour which is permissible in the zone of roadway along which the vehicle is travelling.

Another circuit of a similar nature could be completed with respect to contacts C, D or E, depending on whichsoever of these contacts the switch arm $Y^1$ is in engagement.

Simultaneously current is flowing through the delay relay T from the switch arm $Y^1$, contact B, wire 32, contact B¹, wire 17, delay relay T through the wire 18 to hot wire 13, and thence through the source of electric energy Z to ground, so completing an electric circuit. After a predetermined time limit to which the delay relay T is set, the delay relay will then close its contacts 19 and current flows from the source of electrical energy Z through ground wire 20, contact 19, wire 21, relay $Rf$, wire 22, hot wire 13 to the source of electrical energy Z, then to ground, completing a circuit and energizing the relay $Rf$ which closes its contacts $F^2$ and $F^1$.

Current now flows through the wire 25, contact $F^2$, light V, flasher S, wire 23 to hot wire 13, thence to the source of electrical energy Z and ground, closing a circuit, so that the flasher S and the light V are brought into operation. Simultaneously current flows through the wire 28, contact $F^1$, horn W, wire 26, hot wire 13, source of electrical energy Z to ground, thus completing the circuit, so that the horn W is sounded.

Again the driver of the vehicle should take prompt remedial action and reduce the speed of the motor vehicle when he first hears the dash buzzer, so that the dash buzzer would be shut off. If he has failed to do so, then the buzzer P, the horn W and the flasher light V will all be operated.

The consequence of neglect on the part of the driver to reduce the speed of the vehicle has been referred to above, and need not be repeated or amplified.

As the vehicle proceeds into a forty mile zone of roadway it passes over a light beam M which forms part of the roadway equipment of that zone. The light beam M is properly directed to impinge on the photo electric cell 3 only, and energizes this cell, so closing its contacts, and current flows from the source of electric energy Z through hot wire 13, wire 36, photo electric cell contacts 3, shunt 37, wire 34, relay $Rc$ to ground, thence to the source of energy so energizing the relay and closing the micro switch 35. Simultaneously the micro switch 30 is opened by the relay $Rc$.

The micro switch 11 has been opened by the relay $Rb$, but should the micro switch 11 be inadvertently closed, it will immediately be opened by the relay $Rc$.

As the relay $Rb$ is then de-energized, the contacts B¹, B² and B³ are open but the contacts C¹, C² are closed by the relay $Rc$.

Since the relay contact B¹ is now open, the delay relay and dash buzzer cannot be energized unless the vehicle exceeds 40 m.p.h. and therefore the dash buzzer, horn and flasher light will not go into operation at speeds below 40 m.p.h.

Should the vehicle exceed the 40 m.p.h. speed limit, then r.p.m. switch arm $Y^1$ will make contact with one of the r.p.m. contacts C, D, E, depending on the speed at which the vehicle is travelling, and current will then flow through the appropriate r.p.m. switch contacts C, D, or E, depending upon the speed at which the vehicle is travelling, and current will flow through the appropriate r.p.m. switch contacts $C^1$, $C^2$ or wire 51 (depending upon the position of the arm $Y^1$). For instance if the arm $Y^1$ is in contact with the contact C, then current will flow through the switch arm $Y^1$, contact C, wire 38, contact $C^1$, wire 17, wire 49 to the dash buzzer P, thence through hot wire 13 to the source of electric energy Z to ground and back through the arm $Y^1$, so completing an electric circuit, and the dash buzzer P is sounded to notify the driver of the vehicle that the vehicle is exceeding the speed of 40 m.p.h. which is permissible in in the zone of roadway along which the vehicle is travelling.

Another circuit of a similar nature would be completed with respect to contacts D or E, depending on whichsoever of these contacts the switch arm $Y^1$ is in engagement.

Simultaneously current is flowing through the delay relay T from the switch arm $Y^1$, contact C, wire 36, contact $C^1$, wire 17, delay relay T, through the wire 18 to the hot wire 13 and thence through the source of electric energy Z to ground, so completing an electric circuit.

After a predetermined time limit to which the delay relay T is set, this relay will then close its contacts 19, and current flows from the source of electric energy Z through ground wire 20, contact 19, wire 21, relay Rf, wire 22, hot wire 13 to the source of electric energy Z thence to ground, so completing the circuit and energizing the relay Rf which closes its contacts $F^2$ and $F^1$.

Current now flows through the wire 25, contact $F^2$, light V, flasher S, wire 23, to hot wire 13, thence to the source of electric energy Z and ground, closing a circuit so that the flasher S and the light V are brought into operation. Simultaneously current flows through the wire 28, contact $F^1$, horn W, wire 26, hot wire 13 and source of electric energy Z to ground, and thus completing the circuit so that the horn W is sounded.

Again the driver of the vehicle should take prompt remedial action and reduce the speed of the vehicle when he first hears the dash buzzer, so that the dash buzzer will be shut off. If he has failed so to do, then the buzzer P, the horn W and the flashing light V will all come into operation.

The consequence of neglect on the part of the driver to reduce the speed of the motor vehicle has been previously pointed out and need not be enlarged upon.

As the vehicle proceeds into the fifty mile zone of a roadway, it passes over a light beam M which forms part of the roadway equipment for that zone, this light beam being arranged at the proper angle, and in the proper direction to impinge on photo electric cell 4, and energizes this cell so closing its contacts, and current flows from the source of electric energy Z through hot wire 13, wire 43, photo electric cell contacts 4, shunt 44, wire 41, relay Rd to ground, thence to the source of electric energy Z, so energizing the relay and closing the micro switch 42. Simultaneously the micro switch 35 is opened by the relay Rd.

The micro switches 30 and 11 have been opened previously by the relays Rc and Rb, but should any of these micro switches be inadvertently closed, they will immediately be opened by the energized relay Rd.

As the relay Rc is now de-energized, the contacts $C^1$ and $C^2$ are open, but the contact $D^1$ is closed by the relay Rd.

Since the relay contact $C^1$ is now open, the delay relay and dash buzzer cannot be energized unless the vehicle exceeds a speed of 50 m.p.h. and thus the dash buzzer, horn and flasher light will not go into operation at speeds below 50 m.p.h.

Should the vehicle exceed the 50 m.p.h. limit, then r.p.m. switch arm $Y^1$ will make contact with one of the r.p.m. contacts D or E, depending on the speed at which the vehicle is travelling, and current will then flow through the appropriate r.p.m. contacts D or E, depending on the speed at which the vehicle is travelling, and current will flow through the r.p.m. switch contact $D^1$ or wire 51, depending on the position of the arm $Y^1$. For instance, if the arm $Y^1$ is in contact with the contact D then current will flow through the switch arm $Y^1$, contact D, wire 45, contact $D^1$, wire 17, wire 49 to the dash buzzer P thence through the hot wire 13 to the source of electric energy Z to ground and back through the switch arm $Y^1$, so completing an electric circuit, and the dash buzzer P is sounded to notify the driver that the vehicle is exceeding the speed of 50 m.p.h. which is permissible in the zone of roadway along which the vehicle is travelling.

Another circuit could be completed with respect to contact E if the switch arm $Y^1$ were in engagement with this contact.

Simultaneously current is flowing through the delay relay T from the switch arm $Y^1$, contact D, wire 45, contact $D^1$, wire 17, delay relay T, through the wire 18 to the hot wire 13, and thence through the source of electric energy Z to ground, so completing an electric circuit.

After a predetermined time limit to which the delay relay T is set, this relay will then close its contact 19, and current flows from the source of electric energy Z through ground wire 20, contact 19, wire 21, relay Rf, wire 22, hot wire 13 to the source of electric energy Z thence to ground, so completing the circuit and energizing the relay Rf which closes its contacts $F^2$ and $F^1$.

Current now flows through the wire 25, contact $F^2$, light V, flasher S, wire 23 to the hot wire 13, thence to the source of electric energy Z and ground, closing a circuit, so that the flasher S and light V are brought into operation. Simultaneously current flows through the wire 28, contact $F^1$, horn W, wire 26, hot wire 13 and source of electric energy Z, to ground, and thus completes a circuit, so that the horn W is sounded.

Again the driver of the vehicle should take prompt remedial action and reduce the speed of the vehicle when he first hears the dash buzzer, so that the dash buzzer will be shut off. If he has failed so to do, then the buzzer P, the horn W and the flashing light V will all come into operation.

The consequence of neglect on the part of the driver to reduce the speed of the motor vehicle has been previously pointed out and need not be enlarged upon.

As the vehicle enters a sixty mile zone of a roadway, it passes over a light beam M forming part of the roadway equipment for the zone, and this light beam being arranged at the proper angle, and in the proper direction impinges on photo electric cell 5, and energizes this cell so closing its contacts, and current flows from the source of electric energy Z, hot wire 13, wire 50, photo electric cell contacts 5, to the relay Re and ground, thence to the source of electric energy Z so energizing the relay Re which opens the micro switch 42.

As the relay Re is de-energized, the contact $D^1$ is opened. It will thus be clear that all the contacts pertaining to contacts A, B, C and D are now opened. Should the vehicle exceed the speed of sixty miles an hour, current will flow from the switch arm $Y^1$, contact E, wire 51, wire 17, wire 49, dash buzzer P, hot wire 13 to the source of electric energy Z and through the switch arm Y and the buzzer P will be sounded.

Simultaneously current will flow from the switch arm $Y^1$, contact E, wire 51 to delay relay T, wire 18, hot wire 13 to the source of electric energy Z, and back to the switch arm $Y^1$, closing an electric circuit and energizing the relay Rf which closes the contacts $F^1$ and $F^2$.

Current then flows through the ground wire 25, contact $F^2$, wire 24, light V, flasher S, wire 23, hot wire 13 to the source of energy Z to ground, thereby closing a circuit to actuate the light V and the flasher S. Current also flows from the ground wire 28, contact F¹, horn W, wire 26, hot wire 13 to the source of electric energy Z and thence to ground, so closing a circuit and sounding the horn W.

The driver of the vehicle should take prompt remedial action and reduce the speed of the vehicle when he first hears the dash buzzer, and if he fails to do so then the buzzer P, the horn W and the flashing light V will all come into operation.

The consequence of neglect on the part of the driver to reduce speed of the motor vehicle to that permitted in the zone through which he is traveling, has been previously discussed.

If the vehicle is now proceeding at a speed of sixty miles per hour or under, it may cruise along and the dash buzzer, horn and flashing light will not go into operation.

In pursuing its journey, the vehicle will approach some village, town, etc. in which the speed limit allowed may be as low as 20 or 30 m.p.h. so that the speed of the vehicle will require to be reduced when entering these zones of restricted speed.

For instance, suppose the vehicle were traveling the highway at a speed of fifty miles per hour, and the vehicle is approaching a village through which the speed is restricted to 20 m.p.h. it is quite evident that the driver will require to materially reduce the speed of the vehicle upon entering the 20 m.p.h. zone. If he has not taken action to restrict the speed of the vehicle he will be sharply reminded, because as the vehicle enters the 20 m.p.h. zone, the vehicle will pass over a beam of light N which forms part of the roadway equipment, and this beam of light being properly positioned as to direction and angle, will impinge upon photo electric cell 1 of the vehicle equipment, and so actuate the dash buzzer P as previously described. If the driver fails to take the necessary action to reduce the speed of the vehicle within the time space permitted by the delay relay T on the vehicle, then the flashing light V and horn W will come into operation to quickly remind the driver of his omission to reduce speed to the maximum allowed in that zone.

It is not necessary to recapitulate each step of the operation of the speed control and warning system on the vehicle, since that has been described in detail above.

It should be noted that the actuation of my speed control and warning device, and initiating the several steps in the procedure of giving a primary audible warning followed by a subsequent audible and visual warning is in each case automatic.

Figure 9:
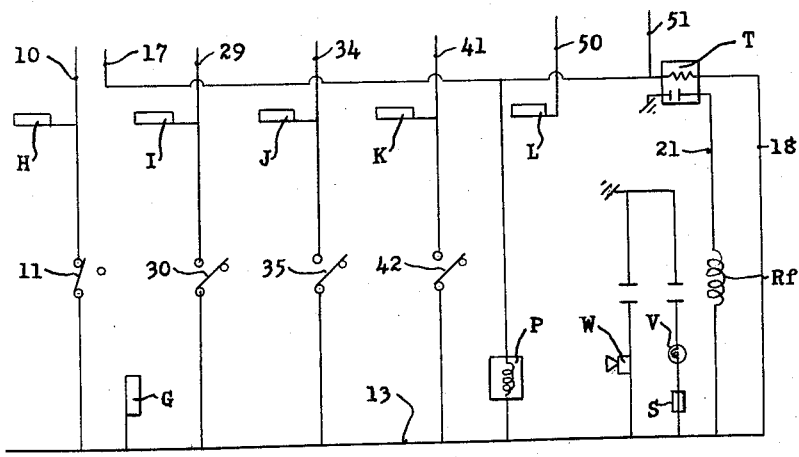
Figure 9 is a diagrammatic layout in part, of the speed control and warning system arranged for wiper contacts between the speed zones of 20 m.p.m. through other zones of up to 60 m.p.h.

Attention is now directed to Figures 7, 8 and 9 in which the photo electric cells are dispensed with and in lieu thereof wipers are provided for switching or bringing into active operation the vehicle equipment of my speed control and warning device.

In the vehicle equipment of my device, a common wiper contact G is provided which is a conductor of electricity, and is electrically connected with the hot wire 13. Electrically connected to each of the wires 10, 29, 34 and 41 are electric wipers H, I, J and K, which are located between the micro switches 11, 30, 35 and 42, and the relays Ra, Rb, Rc and Rd respectively, and to the wire 50, the electric wiper contact L is electrically connected.

The roadway equipment consists of a plurality of electric wipers, each consisting of a pair of spaced upwardly projecting arms N and O formed of electric conducting material, and these arms are electrically connected and the gap between each pair of arms will be governed by the space between the common wiper G and the wipers H, I, J, K and L respectively on the vehicle equipment.

This spacing is seen in Figure 7, in which the reference letters da, db, dc, dd, and de show the gaps between the roadside wipers N and O, as required in roadway zones of 20 m.p.h., 30 m.p.h., 40 m.p.h., 50 m.p.h., and 60 m.p.h.

In all other respects the vehicle electrical equipment is the same as that shown and described in detail in Figure 6 in association with the photo electric cell switching method When a vehicle equipped with my electrical wiping means is entering a 20 m.p.h. zone of roadway, the roadway wiper with the gap da engages the common wiper G and the wiper H, so that the relay Ra is energized and closes the micro switch 11.

Similarly when the vehicle is entering a 30 m.p.h. roadway zone the roadway wiper with the gap db will engage the common wiper G and the wiper I, so that the relay Rb is energized and closes the micro switch 30.

Similarly when the vehicle is entering the forty mile zone of roadway the wiper having a gap of dc engages the common wiper G and the wiper J, and energizes the relay Rc and closes the micro switch 35.

Also when the vehicle is entering a fifty mile zone of roadway, the roadway wiper having the gap dd will engage the common wiper G and the wiper K, and energize the relay Rd and close the micro switch 42.

When the vehicle is entering a sixty mile zone of roadway then the roadway wiper having the gap de will engage the common wiper G and the wiper L and energize the relay Re.

In other respects the vehicle equipment is the same as that described above in detail, and its function is the same as that previously described with respect to Figure 6, so that to avoid prolixity in the specification it is not thought necessary to recapitulate the various steps of procedure previously described.

It will be evident that instead of using photo electric cells or electric wipers as above described, I may use a radio switching device or a mechanical switching device, but these will not in any way alter the functioning of the vehicle equipment as above described but will only be used in certain places and districts where their use will be deemed advisable.

Referring to Figure 10, I have disclosed an auxiliary circuit in which the hot wire 13 is connected through the wires 60, 61, 62, 63 and 64 with coloured lamps or lights 70, 71, 72, 73 and 74, and these lights are connected to one side of the contacts A⁵, B⁴, C³, D² and E¹, the opposite side of each of these contacts being grounded.

The contacts A⁵, B⁴, C³, D² and E¹ are controlled by the relays Ra, Rb, Rc, Rd and Re respectively. When the motor vehicle is travelling through a twenty mile zone of a roadway, the relay Ra being energized, then the contact A⁵ will be closed and the lamp 70 illuminated since current will flow from the source of electric supply Z through the hot wire 13, wire 60, light 70, switch A⁵ to ground and back to the source of electric supply so that the circuit is closed. As the vehicle leaves the twenty mile zone and enters the thirty mile zone of the roadway, then the lamp 70 is extinguished and the lamp 71 is illuminated.

The illuminating of the lamp 71 is brought about as the relay Rb is energized, closing the contact B⁴ and opening the contact A⁵, and current flows from the source of electrical supply Z, hot wire 13, wire 61, lamp 71, switch B⁴ to ground and thence to the source of electric supply.

It is not thought necessary to describe the manner in which the lamps 72, 73 and 74 are illuminated, because this is accomplished in a manner similar to that described respecting the lamps 70 and 71.

By the use of these coloured lights, representing the various speeds allowed in different speed zones of a roadway, it will be clear that an indication is given showing whether or not the speed control warning device has switched to the proper speed setting for the particular zone in which the vehicle is travelling. Should the coloured light illuminated not be a proper representation of the speed allowed in that zone, then a traffic officer would instantly recognize that the automatic switching mechanism was not functioning as intended and would signal the driver to stop the vehicle and ascertain the cause of such failure, ordering the correction of any defect or charging the driver if wilful tampering appeared present. This auxiliary tell-tale system provides for visual check of the proper functioning of the speed zone automatic circuit selector.

Throughout the specification reference has been made to a preliminary warning device and a subsequent signal. The warning device is described as a buzzer on the dash but may take other forms; its purpose being a "local" signal intended solely or principally for the driver. The signal in the time-delayed circuit may be considered the main or principal signal—being a further, second or subsequent signal either or both audible and visible and intended to inform those outside the vehicle as well as the driver of the continuing infraction of the speed law.

Having thus described the invention, what is claimed as new is:

1. A vehicle control and warning device for use with a speed zoned roadway comprising a switch having a plurality of contacts, a switch arm co-acting therewith, the contacts being arranged to progressively correspond with the speed of the vehicle, an electric circuit, an audible warning device in the circuit, the contacts being individually connected to the circuit to form a plurality of similar circuits, switches in each similar circuit, relays associated with each contact and designed to be energized as the vehicle enters the related speed zone, the said relays when energized closing the switch of its associated similar circuit and simultaneously opening the switches related to any other zone that may be closed, the warning device being sounded if the speed of the vehicle exceeds that of the zone through which the vehicle is travelling, a plurality of auxiliary circuits having a plurality of lights arranged in parallelism, and relays controlling the operation of the auxiliary circuits, a light in each circuit representative of the speed zone through which the vehicle is travelling being lighted as the vehicle enters the road zone to indicate that the electrically responsive means and the switch controlling same are functioning properly.

2. A vehicle control and warning device for use with a roadway divided into a plurality of speed zones and including a switch provided with a plurality of contacts related to the speed zones, a switch arm successively engaging the contacts, an electric circuit, the contacts being individually connected to the circuit to form a plurality of similar circuits, switches in each similar circuit, a relay circuit corresponding to each similar circuit, a micro switch in each relay circuit, each relay being energized only when the switch arm engages a contact with which the relay is related to close the micro switch in such relay circuit, a normally open circuit including a visual warning device connected to the first said circuit, a normally open circuit including an audible warning device connected to the first said circuit, a delay relay operatively connected to the first circuit to permit the operation in predetermined order of each warning device, a relay controlling the operation of the visual and audible circuits, the visual warning device being operated by the last said relay when the vehicle exceeds a predetermined permissible speed and the audible device being subsequently continuously operated by the last said relay if the vehicle continues to exceed the permissible speed, each warning device being rendered non-operative when the vehicle speed has been reduced to conform to the speed of the zone in which the vehicle is traveling, and a plurality of light circuits arranged in parallel and each provided with an external indicating lamp relating to a particular contact and associated with a related similar circuit, each light circuit being provided with a normally open switch, the switch in the similar circuit and the switch in the corresponding light circuit being simultaneously energized by the relay circuit of the speed zone relating to the above mentioned contact whereby when a vehicle enters a zone the appropriate external signalling light will be illuminated to indicate that the vehicle has entered the zone and similarly the control device will be energized to show any infraction of speed when travelling through the zone.

References Cited in the file of this patent

UNITED STATES PATENTS 2,640,979     Carter _____ June 2, 1953